United States Patent [19]

Kumpf et al.

[11] Patent Number: 5,169,907

[45] Date of Patent: Dec. 8, 1992

[54] POLYETHER/POLYCARBONATE BLOCK COPOLYMERS AND A PROCESS FOR THEIR PRODUCTION

[75] Inventors: Robert J. Kumpf; Dittmar K. Nerger, both of Pittsburgh, Pa.; Rolf Wehrmann, Krefeld, Fed. Rep. of Germany; Harald Pielartzik, Pittsburgh, Pa.

[73] Assignee: Miles Inc., Pittsburgh, Pa.

[21] Appl. No.: 614,787

[22] Filed: Nov. 14, 1990

[51] Int. Cl.$^5$ .................... C08G 81/00; C08G 64/18; C08G 75/23

[52] U.S. Cl. ................... 525/462; 525/394; 525/439; 525/450; 525/469; 525/471; 528/125; 528/175

[58] Field of Search ........... 525/394, 439, 450, 462, 525/471, 469; 528/125, 175

[56] References Cited

U.S. PATENT DOCUMENTS 4,982,014  1/1991  Freitag .................... 528/204
5,077,351  12/1991  Matzner ................... 525/439

FOREIGN PATENT DOCUMENTS 353478  2/1990  European Pat. Off.

OTHER PUBLICATIONS

McGrath et al., Poly. Eng. Sci., 1977, 17, 648.

Primary Examiner—David J. Buttner
Attorney, Agent, or Firm—Joseph C. Gil; Lyndanne M. Whalen

[57] ABSTRACT

A block copolymer represented by the formula

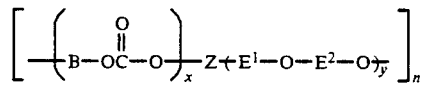

are formed by contracting an ester group containing poly(aryl ether) composed of the recurring units

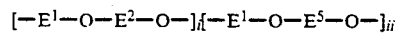

with a polyarylcarbonate composed of the recurring units

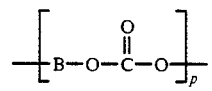

in which B, Z, $E^5$, $E^1$, $E^2$ x, y, n and p represent specified groups or values under conditions such that ester/carbonate interchange reactions will occur.

10 Claims, No Drawings

POLYETHER/POLYCARBONATE BLOCK COPOLYMERS AND A PROCESS FOR THEIR PRODUCTION

BACKGROUND OF THE INVENTION

The present invention relates to polyether/polycarbonate block copolymers and to a process for their production.

Polycarbonates are well-known commercially available resinous materials having a variety of applications. Polycarbonates are typically prepared by the reaction of dihydroxy compounds and a carbonate precursor, such as phosgene and aromatic dicarboxylic acid dihalides. Polycarbonates are high temperature, high performance thermoplastic engineering polymers with a combination of good thermal and good mechanical properties, particularly if the polycarbonate has been prepared from an aromatic diol. Known polycarbonates are, however, unsuitable for applications where hydrolytic stability and solvent resistance are required.

Attempts have therefore been made to modify the known polycarbonates in a manner such that the advantageous thermal and mechanical properties are retained but the problems of lack of hydrolytic stability and lack of adequate solvent resistance are overcome. Because polycarbonates are generally incompatible with other resinous materials, one approach to resolving this problem has been to polymerize non-polycarbonate resinous materials into the polycarbonate molecule to produce a block copolymer. Condensation block copolymers are normally synthesized as shown below:

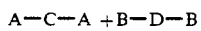

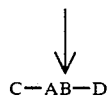

Either two telechelic oligomers are coupled, or monomers are polymerized in the presence of a telechelic oligomer (see, for example, McGrath et al Poly. Eng. Sci. 1977, 17, 648). Another approach is disclosed in Published European Patent Application 353,478. More specifically, European Application 353,478 discloses a process for making poly(aryl ether/thioether)poly(aryl carbonate) block copolymers in which a portion of the poly(aryl ether/thioether) blocks are joined to the poly(aryl carbonate) blocks through an ether oxygen or thioether sulfur atom.

The copolymers produced in accordance with European Patent Application 353,478 do not, however, have a predictable block length and require reaction times such that the reaction can not be carried out in an extruder. These copolymers would not therefore be suitable for in situ compatibilization of a polymer blend in processing equipment such as extruders or for applications which require block copolymers having long polyether segments.

SUMMARY OF THE INVENTION

It is an object of the present invention to provide polyetherketone/polycarbonate block copolymers which have a predictable block length.

It is another object of the present invention to provide polyether ketone/polycarbonate block copolymers which may be formed in an extruder.

It is also an object of the present invention to provide a process for producing polyether ketone (or other polyaryl ether)/polycarbonate block copolymer via transesterification of an ester-containing polyaryl ether and a polycarbonate.

Another object of the present invention to provide a process for producing polyether ketone/polycarbonate block copolymers which may be carried out in a relatively short period of time.

It is also an object of the present invention to provide a process for producing polyether ketone/polycarbonate block copolymers in which no catalyst need be employed.

These and other objects which will be apparent to those skilled in the art are accomplished by copolymerizing an ester group containing polyether ketone with a polycarbonate. This copolymerization may be carried out in the presence of a solvent or it may be carried out by melt blending the ester-containing polyether ketone and the polycarbonate.

DETAILED DESCRIPTION OF THE PREFERRED EMBODIMENTS OF THE INVENTION

The present invention relates to block copolymers represented by the formula

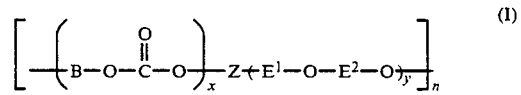

in which
B represents the residuum of a dihydric phenol,
Z represents the group

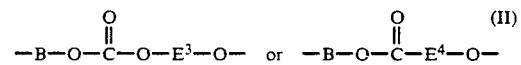

in which
$E^3$ and $E^4$ each represent one of the two possible groups derived from transesterification of the residuum $E^5$
$E^5$ represents the residuum of an ester group-containing bisphenol,
$E^1$ represents the residuum of a benzenoid compound having an electron withdrawing group in at least one of the positions ortho or para to the valence bonds having a sigma value sufficient to activate a halogen enough to promote reaction of the halogen with an alkali metal phenolate,
$E^2$ represents the residuum of a dihydric phenol which does not contain ester groups,
x represents the average number of repeated aryl carbonate units in the block copolymer,
y represents the average number of repeated aryl ether units in the block copolymer, and
n represents the degree of polymerization.

In the preferred block copolymers of the present invention,
B represents the residuum of one of the following groups: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, 4,4'-dihydroxy-diphenyl-sulfone, 1,6-naphthaindole, 1,7-naphthaindole, 2,6-naphtha-indole, 2,7-naphthaindole, 4,4'-dihdroxy-diphenylsulfone and 4,4'-dihydroxy-benzophenone, most preferably, 2,2-bis-(4-hydroxyphenyl)-propane;

$E^3$ and $E^4$ each represent one of the two possible groups derived from the residuum $E^5$;

$E^5$ represents the residuum of an ester group-containing bisphenol, preferably from 4'-hydroxyphenyl-4-hydroxybenzoate;

$E^1$ represents the residuum of a benzenoid compound having an electron withdrawing group in at least one of the positions ortho or para to the valence bonds having a sigma value sufficient to activate a halogen enough to promote reaction of the halogen with an alkali metal phenolate, most preferably, difluorobenzophenone, dichlorodiphenylsulfone;

$E^2$ represents the residuum of a dihydric phenol which does not contain ester groups, most preferably, 3,2-bis-(4-hydroxyphenyl)-propane;

x represents the average number of repeated aryl carbonate units, preferably 2–200, most preferably 5–40;

y represents the average number of repeated aryl ether units, preferably 2–200, most preferably 5–40; and n represents the degree of polymerization, preferably 1–500, most preferably 20–100.

The block copolymers of the present invention are produced by reacting an ester group-containing poly(aryl ether) represented by the formula $$-[-E^1-O-E^2-O-]_i-[-E^1-O-E^5O-]_{ii} \quad (III)$$

in which $E^5$, $E^1$ and $E^2$ are as defined above and i and ii each represents an integer such that the sum of i plus ii totals 100, provided that ii is greater than 0.

In one process for producing such ester group containing aromatic polyether ketones, aromatic dihalides are reacted with aromatic bisphenols which do not include ester groups and with aromatic bisphenols which do include a ester group. The aromatic dihalides used in this disclosed process are represented by the formula

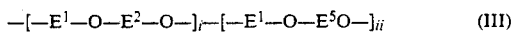

(IV)

in which

X represents fluorine, chlorine or bromine, preferably, fluorine or chlorine;

$R_1$ and $R_2$ each represent a halogen atom, preferably fluorine, chlorine or bromine; hydrogen; a $C_1$–$C_4$ alkyl group, preferably, a methyl or ethyl group; a $C_6$–$C_{12}$ aryl group, preferably a phenyl or biphenyl group; or a $C_7$–$C_{12}$ aralkyl group, preferably a methylphenyl or ethylphenyl group;

A represents $SO_2$, CO, SO or a group corresponding to the formula

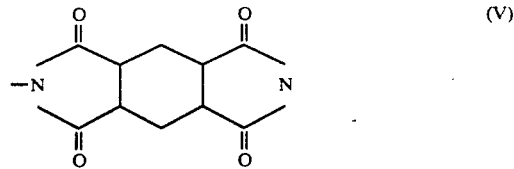

(V)

preferably, CO or $SO_2$ and m represents 0 or an integer of from 1 to 4, preferably, 0, 1 or 2.

Specific examples of suitable aromatic dihalogen compounds include: 4,4'-dichlorophenylsulphone, 4,4'-difluorodiphenylsulphone, 4,4'-difluorobenzophenone and 4,4'-dichlorobenzophenone.

The aromatic bisphenols which do not include a ester group useful in producing the ester group containing polyethers include those which are represented by the formula

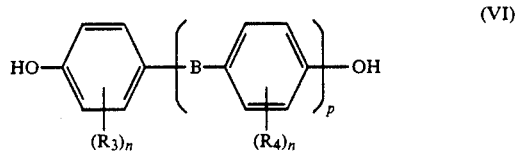

(VI)

in which $R_3$ and $R_4$ each represent a halogen atom, preferably fluorine, chlorine or bromine; hydrogen; a $C_1$–$C_4$ alkyl group, preferably, a methyl or ethyl group; a $C_6$–$C_{12}$ aryl group; preferably a phenyl or biphenyl group; or a $C_7$–$C_{12}$ aralkyl group, preferably a methylphenyl or ethylphenyl group;

B represents a chemical bond; CO; O; S; $SO_2$; $R_5$—C—$R_6$ or —C—$(Z)_q$—$R_7R_8$ in which Z represents carbon;

q represents an integer of from 4 to 7, preferably 4 or 5; and $R_7$ and $R_8$ each represent for each Z hydrogen or a $C_1$–$C_6$ alkyl group, preferably hydrogen or a methyl group;

n has the same meaning as given above; and p represents 0 or an integer of from 1 to 3, preferably 0 or 1.

Specific examples of bisphenols which correspond to formula VI that are useful in the production of the ester group containing polyethers employed in the present invention include: hydroquinone, methylhydroquinone, phenylhydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzenes. Preferred bisphenols include: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4- hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, 4,4'-dihydroxy-diphenylsulfone, 1,6-naphthaindole, 1,7-naphthaindole, 2,6-naphthaindole, 2,7-naphthaindole, 4,4'-dihdroxy-diphenylsulfone and 4,4'-dihydroxy-benzophenone.

The aromatic bisphenols containing a ester group which are useful in producing the ester group containing polyethers include those which are represented by the formula

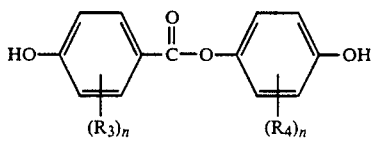

in which

R$_3$ and R$_4$ each have the meanings given above and n has the same meaning as above.

Specific examples of such ester containing bisphenols useful in producing ester group-containing polyethers include: 4-hydroxyphenyl-4-hydroxybenzoate and bis-(4'-hydroxybenzoyl)-1,4-dihydroxybenzene.

The ester group containing polyether-forming reaction is generally carried out in the presence of a basic catalyst and in the presence of a dipolar, aprotic solvent. The basic catalyst is generally used in an amount of from about 1 to about 1.3 equivalents of catalyst per equivalent of total dihydroxy compound (i.e., total amount of bisphenol represented by formula VI plus bisphenol represented by formula VII). Suitable basic catalysts include alkali metal salts and alkaline earth metal salts. Specific examples of appropriate basic catalysts are sodium hydroxide, potassium hydroxide, sodium methanolate, potassium carbonate and potassium bicarbonate.

Suitable solvents include N-methylpyrrolidone, N-methylcaprolactam, dimethylsulfoxide, diphenylsulfone and sulfolan. These solvents are generally employed in an amount of from about 0.5 to about 50 parts by weight, preferably from about 2 to about 20 parts by weight based on the total weight of the reactants.

The ester group containing polyethers are generally prepared by reacting the dihalide and bisphenols at temperatures of from about 130° to about 320° C., preferably from about 145° to about 280° C. for from about 1 to about 50 hours, preferably from about 2 to about 20 hours. The reaction may be carried out under pressures of from about 0.8 to about 10 bar but ambient pressure is preferred. Suitable techniques for carrying out the polyether forming reaction are known.

The ester group containing polyethers prepared by this process or any other suitable technique are characterized by average molecular weights (as determined by gel permeation chromatography using polystyrene as the standard) of from about 560 to about 300,000, preferably from about 1000 to about 200,000 and most preferably from about 2000 to about 100,000.

The ester group containing polyethers may be reacted with any of the known polycarbonates. Specific examples of appropriate polycarbonates include those represented by the formula

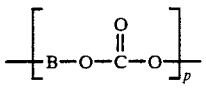

in which

B represents a non-activated aromatic radical characterized by the absence of an electron withdrawing group located in a position ortho or para to its carbonate valence bond. Appropriate polycarbonates also include copolymers, i.e., polycarbonates in which the B radical for each repeating unit is not the same. Examples of preferred B radicals include: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, 4,4'-dihydroxy-diphenylsulfone, 1,6-naphthaindole, 1,7-naphthaindole, 2,6-naphthaindole, 2,7-naphthaindole, 4,4'-dihdroxy-diphenylsulfone and 4,4'-dihydroxy-benzophenone, most preferably, 2,2-bis-(4-hydroxyphenyl)-propane, and p represents the number of repeated aryl carbonate units.

The reaction of polycarbonate with ester group-containing polyether can be carried out in the presence of a solvent. Suitable solvents include: chlorobenzene, dichlorobenzene, toluene. The solvent is generally used in an amount of at least 30% wt., preferably 50% wt.

A catalyst is not necessary in the process of the present invention, however, it would be possible to include a catalyst. Where used, the catalyst is generally employed in an amount of from about 0.1 to about 1.0 wt. %. Specific examples of suitable catalysts include: potassium acetate, sodium acetate, antimony trioxide.

Other materials which may optionally be included in the reaction mixture are inert poly aryl ether homopolymers.

The process of the present invention may carried out at temperatures of from about 110° C. to about 300° C., preferably, from about 250° C. to about 270° C. The reaction may optionally be carried out under pressure. Suitable pressures include: 10–300 psi.

The block copolymers of the present invention are characterized by being high temperature, high performance thermoplastic engineering polymers with a combination of good thermal and good mechanical properties. They may be microphase separated block copolymers in which case they will possess two glass transition temperatures (Tg's). They also may be homogeneous block copolymers in which case they will have a single Tg. In some cases the physical properties of the copolymers will be a weight average of the constituent homopolymer. In other cases however, synergistic behavior is observed and the physical properties of the block copolymers are superior to either homopolymer. These properties make them particularly useful as compatibilizing agents in polymer blends (as described by Olabisi, Robeson, and Shaw in "Polymer-Polymer Miscibility" Academic Press 1979).

Having thus described our invention in detail, the following examples are given as being illustrative thereof. All parts and percentages given in these examples are parts by weight and percentages by weight, unless otherwise indicated.

EXAMPLES

Example 1

Synthesis of Ester-containing Poly (etherketone)

Difluorobenzophenone (21.82 g; 0.1 mol), bisphenol A (21.73 g; 0.0952 mol), 4'-hydroxy phenyl-4-hydroxybenzoate (1.104 g; 0.0048 mol.), and $K_2CO_3$ (15.2 g; 0.11 mol) were combined with 100 ml of N-methyl-2-pyrolidinone (NMP) and 65 ml toluene in a 250 ml 3-neck flask (all glassware was previously flame dried). A mechanical stirrer, Dean-Stark trap (12 ml volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time toluene and water collected in the Dean-Stark trap. After 8 hours, 20 ml of toluene and water were allowed to drain from the trap and the temperature was raised to 180° C. After 5 hours the toluene was drained and the temperature increased to 187° C. for 2 hours. During this time, the yellow/green solution became very viscous. The solution was cooled to room temperature, diluted with 100 ml NMP, then poured into a large excess of methanol to precipitate a fibrous white polymer which was collected and redissolved in methylene chloride. The methylene chloride solution was washed with 10% HCl and water. Methanol was then added to precipitate the polymer which was dried in vacuum at 80° C. for 8 hours. A yield of 97%-99% was obtained.

Polymer Characterization

Molecular weight as measured by gel permeation chromatography (GPC) (polystyrene standard)

$M_w = 47000$ $M_n = 22300$ $M_w/M_n = 2.1$

Thermal properties as measured by differential scanning calorimetry (DSC): $T_g = 140°$ C.

Example 2

Synthesis of Ester-containing Poly (etherketone)

Difluorobenzophenone (21.82 g; 0.1 mol), bisphenol A (20.75 g; 0.0909 mol), 4'-hydroxy phenyl-4-hydroxybenzoate (2.093 g; 0.0091 mol.), and $K_2CO_3$ (15.2 g; 0.11 mol) were combined with 100 ml of NMP and 65 ml toluene in a 250 ml 3-neck flask (all glassware was previously flame dried). A mechanical stirrer, Dean-Stark trap (12 ml, volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time, toluene and water collected in the Dean-Stark trap. After 8 hours, 20 ml of toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP and then poured into a large excess of methanol to precipitate a fibrous white polymer. The fibrous white polymer was collected and redissolved in methylene chloride. The methylene chloride solution was washed with 10% HCl, water, and then poured into methanol to precipitate the polymer which was dried in vacuum at 80° C. for 8 hours. A yield of 97%-99% was obtained.

Polymer Characterization

Molecular weight as measured by GPC (polystyrene standard)

$M_w = 34200$ $M_n = 20400$ $M_w/M_n = 1.7$

Thermal properties as measured by DSC: $T_g = 153°$ C.

Example 3

Synthesis of Ester-containing Poly (ethersulfone)

Difluorodiphenylsulfone (25.43 g; 0.1 mol), bisphenol A (21.73 g; 0.0952 mol), 4'-hydroxy phenyl-4-hydroxybenzoate (1.104 g; 0.0048 mol.), and $K_2CO_3$ (15.2 g; 0.11 mol) were combined with 100 ml of NMP and 65 ml toluene in a 250 ml 3-neck flask (all glassware was previously flame dried). A mechanical stirrer, Dean-Stark trap (12 ml volume) with condenser and $N_2$ outlet and a Claisen adapter with $N_2$ inlet and thermocouple were attached and the entire system was purged with $N_2$ for 10 minutes. The solution was heated at 155° C. for 8 hours. During this time, toluene and water collected in the Dean-Stark trap. After 8 hours, 20 ml of toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP and then poured into a large excess of methanol to precipitate a fibrous white polymer. The fibrous white polymer was collected and redissolved in methylene chloride. The methylene chloride solution was washed with 10% HCl and water and then poured into methanol to precipitate the polymer. The polymer was dried in vacuum at 80° C. for 8 hours. A yield of 97%-99% was achieved.

Polymer Characterization

Molecular weight as measured by GPC (polystyrene standard)

$M_w = 55600$ $M_n = 25600$ $M_w/M_n = 2.2$

Thermal properties as measured by DSC: $T_g = 154°$ C.

Example 4

Synthesis of Ester-containing Poly (ethersulfone)

Difluorodiphenylsulfone (25.43 g; 0.1 mol), bisphenol A (20.75 g; 0.0909 mol), 4'-hydroxy phenyl-4-hydroxybenzoate (2.093 g; 0.0091 mol.), and $K_2CO_3$ (15.2 g; 0.11 mol) were combined with 100 ml of NMP and 65 ml toluene in a 250 ml 3-neck flask (all glassware was previously flame dried). A mechanical stirrer, Dean- Stark trap (12 mL volume) with condenser and N$_2$ outlet and a Claisen adapter with N$_2$ inlet and thermocouple were attached and the entire system was purged with N$_2$ for 10 minutes. The solution was heated at 155° C. for 8 hours. During this time, toluene and water collected in the Dean-Stark trap. After 8 hours, 20 ml of toluene and water were allowed to drain from the trap and the temperature was raised to 180° C. After 5 hours, the toluene was drained and the temperature increased to 187° C. for 2 hours. During this time, the yellow/green solution became very viscous. The solution was cooled to room temperature, diluted with 100 ml NMP and then poured into a large excess of methanol to precipitate a fibrous white polymer. This fibrous white polymer was collected and redissolved in methylene chloride. The methylene chloride solution was washed with 10% HCl and water and then poured into methanol to precipitate the polymer. The polymer was then dried in a vacuum at 80° C. for 8 hours. A yield of 97%–99% polymer with an inherent viscosity (NMP, 30° C.) of 0.45 dL/g. was obtained.

Thermal properties as measured by DSC: T$_g$ = 165° C.

Example 5

Saponification of Ester-containing Poly (etherketone)

The ester-containing poly(etherketone) described in Example 1 and potassium hydroxide (2 g) were dissolved in methanol (20 mL) and methylene chloride (60 mL). This mixture was stirred at room temperature for approximately 1 hour. The solution was carefully acidified with HCl until the pH was 6 and the volatile solvents were allowed to evaporate. The solid material was refluxed with 20 mL of acetic anhydride and 1 mL of pyridine for 30 min. The volatile liquid was again evaporated. The solid taken up into methylene chloride was again washed with water, dried over magnesium sulfate and then rotoevaporated to give an off-white solid. This solid was dried in vacuo at 100° C. for 6 hours. The molecular weight of the material was determined by GPC (polystyrene standard).

This procedure was repeated on a sample of the polymer prepared by the procedure described in Example 2 and on poly(etherketone) homopolymer having no ester groups, (Prepared as described in example 9 and by McGrath et al, Polym, Eng. Sci. 1977, 17, 648). The results (summarized below) indicate that the ester group is incorporated along the polymer backbone. The poly(etherketone) homopolymer (no ester groups) was essentially unchanged in molecular weight whereas ester-containing polymers decreased in proportion to the amount of ester bisphenol.

TABLE 1

| BPA: Ester bisphenol | Saponification Study | | |
|---|---|---|---|
| | M$_w$ | M$_w$* | % change |
| homopolymer | 44600 | 46100 | +3% |
| Example 1 (20:1) | 7000 | 25400 | −45% |
| Example 2 (10:1) | 34200 | 14000 | −60% |

M$_w$ — before saponification;
M$_w$* — after saponification

Example 6

Poly(etherketone)/Polycarbonate Block Cooolvmer

The ester-containing polyether ketone prepared in accordance with Example 1 (3.5 g), the thermoplastic polyester carbonate sold under the trademark Apec 9350 by Mobay Corporation (14.0 g), and 30.0 ml chlorobenzene were placed in a 100 ml resin kettle equipped with mechanical stirrer, N$_2$ inlet and short path condenser. The mixture was degassed 3 times, placed under a continuous N$_2$ flow and then heated to 275° C. The chlorobenzene quickly distilled off to give a polymer melt which was stirred for a total of 3 hours at 275° C. The block copolymer was cooled to room temperature, dissolved in methylene chloride, precipitated into methanol and then dried in vacuo at 80° C. for 8 hours.

A 5 mil film of this copolymer was solution cast from methylene chloride. The film was optically clear and showed no evidence of phase separation. The analogous physical blend formed a cloudy, phase separated film which had two T$_g$'s (155° C. & 174° C.).

Polymer Characterization

Molecular weight as measured by GPC (polystyrene standard)

M$_n$ = 23900

M$_n$ = 23900

M$_w$/M$_n$ = 1.95

Thermal properties as measured by DSC: T$_g$ = 165° C.

Example 7

Poly(etherketone)/Polycarbonate Block Copolymer

The ester-containing polyether ketone prepared in Example 1 (8.75 g), the thermoplastic polyester carbonate which is sold under the trademark Apec 9350 by Mobay Corporation (8.75 g), and 30.0 ml chlorobenzene were placed in a 100 ml resin kettle equipped with mechanical stirrer, N$_2$ inlet and short path condenser. The mixture was degassed 3 times, placed under a continuous N$_2$ flow then heated to 275° C. The chlorobenzene quickly distilled off to give a polymer melt which was stirred for a total of 3 hours at 275° C. The block copolymer was cooled to room temperature, dissolved in methylene chloride, precipitated into methanol and then dried in vacuo at 80° C. for 8 hours.

A 5 mil film of this copolymer was solution cast from methylene chloride. The film was optically clear and showed no evidence of phase separation. The analogous physical blend formed a cloudy, phase-separated film.

Polymer Characterization

Molecular weight as measured by GPC (polystyrene standard)

M$_w$ = 47000

M$_n$ = 23200

M$_w$/M$_n$ = 2.0

Thermal properties as measured by DSC: T$_g$ = 156° C.

Example 8

Poly(etherketone)/Polycarbonate Block Copolymer

The ester-containing polyether ketone prepared in Example 1 (14.0 g), the thermoplastic polyester carbonate which is sold under the trademark Apec 9350 by Mobay Corporation) (3.5 g), and 30.0 ml chlorobenzene were placed in a 100 ml resin kettle equipped with mechanical stirrer, N$_2$ inlet and short path condenser. The mixture was degassed 3 times, placed under a continuous N$_2$ flow and then heated to 275° C. The chlorobenzene quickly distilled off to give a polymer melt which was then stirred for a total of 3 hours at 275° C. The block copolymer was cooled to room temperature, dissolved in methylene chloride, precipitated into methanol and then dried in vacuo at 80° C. for 8 hours.

A 5 mil film of this copolymer was solution cast from methylene chloride. The film was optically clear an showed no evidence of phase separation. The analogous physical blend formed a cloudy, phase separated film.

Polymer Characterization

Molecular weight as measured by GPC (polystyrene standard)

$M_w = 51300$ $M_n = 24900$ $M_w/M_n = 2.1$

Thermal properties as measured by DSC: $T_g = 154°$ C.

Example 9

Comparative Example

Physical Blend of Poly(etherketone) & Polycarbonate

The procedure described in Example 1 was repeated using the same materials in the same amounts with the exception that no 4'-hydroxyphenyl-4-hydroxy-benzoate was included and the amount of bisphenol A used was increased to 22.82 g (0.1 mol) to produce a polyetherketone of the type described by McGrath et al, Polym. Eng. Sci., Vol. 17, page 648 (1977).

The polyether ketone homopolymer (3.5 g), the thermoplastic polyester carbonate which is sold under the trademark Apec 9350 by Mobay Corporation (14.0 g), and 30.0 ml chlorobenzene were placed in a 100 ml resin kettle equipped with mechanical stirrer, $N_2$ inlet and short path condenser. The mixture was degassed 3 times, placed under a continuous $N_2$ flow and then heated to 275° C. The chlorobenzene quickly distilled off to give a polymer melt which was stirred for a total of 3 hours at 275° C. The block copolymer was cooled to room temperature, dissolved in methylene chloride, precipitated into methanol and then dried in vacuo at 80° C. for 8 hours.

A 5 mil film of this blend was solution cast from methylene chloride. The film was cloudy and obviously phase separated Thermal properties as measured by DSC: $T_g = 161°$ C. & 178° C.

Example 10

Preparation of Block Copolymer in a Haake Mixer

The ester-containing polyether ketone prepared in Example 1 (3.5 g), the thermoplastic polyester carbonate which is sold under the trademark Apec 9350 by Mobay Corporation (14.0 g), were placed in a Haake mixer equipped with kneading elements. The polymers were melt blended at 270° C. for 5 min. A clear, yellow polymer formed. A 5 mil film of this copolymer was solution cast from methylene chloride. The film was optically clear an showed no evidence of phase separation.

Polymer Characterization

Molecular weight as measured by GPC (polystyrene standard)

$M_w = 51600$ $M_n = 27000$ $M_w/M_n = 1.9$

Thermal properties as measured by DSC: $T_g = 164°$ C.

Example 11

Preparation of Block Copolymer in a Haake Twin Screw extruder

The ester-containing polyether ketone prepared in Example 1 (3.5 g), the thermoplastic polyester carbonate which is sold under the trademark Apec 9350 by Mobay Corporation (14.0 g), were placed in a Haake system 90 kneader equipped with extruder (TW100). The melted polymer was extruded through a ribbon die. As the temperature was raised from 250° C. to 270° C., the opaque melt became clear. The clear ribbon was characterized by DSC. F: The block copolymer showed a single $T_g$ at 167° C.

Example 12

Poly(ethersulfone)/Polycarbonate Block Copolymer

The ester-containing poly(ethersulfone) prepared in Example 3 (3.5 g), the carbonic acid polyester of bisphenol A which is sold under the trademark Makrolon 2800 by Mobay Corporation (14.0 g), and 30.0 ml chlorobenzene were placed in a 100 ml resin kettle equipped with mechanical stirrer, $N_2$ inlet and short path condenser. The mixture was degassed 3 times, placed under a continuous $N_2$ flow and then heated to 275° C. The chlorobenzene quickly distilled off to give a polymer melt which was stirred for a total of 3 hours at 275° C. The block copolymer was cooled to room temperature, dissolved in methylene chloride, precipitated into methanol and then dried in vacuo at 80° C. for 8 hours.

A 5 mil film of this copolymer was solution cast from methylene chloride. The film was optically clear an showed no evidence of phase separation. The analogous physical blend formed a cloudy, phase separated film.

Thermal properties as measured by DSC: $T_g = 150°$ C.

Example 13

Poly(ethersulfone)/Polycarbonate Block Copolymer

The ester-containing poly(ethersulfone) prepared in Example 3 (14.0 g), the carbonic acid polyester of bisphenol A which is sold under the trademark Makrolon 2800 by Mobay Corporation (13.5 g), and 30.0 ml chlorobenzene were placed in a 100 ml resin kettle equipped with mechanical stirrer, $N_2$ inlet and short path condenser. The mixture was degassed 3 times, placed under a continuous $N_2$ flow and then heated to 275° C. The chlorobenzene quickly distilled off to give a polymer melt which was stirred for a total of 3 hours at 275° C. The block copolymer was cooled to room temperature, dissolved in methylene chloride, precipitated into methanol and then dried in vacuo at 80° C. for 8 hours.

A 5 mil film of this copolymer was solution cast from methylene chloride. The film was optically clear an showed no evidence of phase separation. The analogous physical blend formed a cloudy, phase separated film.

Thermal properties as measured by DSC: $T_g = 157°$ C.

Example 14

Mechanical Properties of Poly(etherketone)/Polycarbonate Block Copolymers

The ester-containing poly(etherketone) described in Example 1, the block copolymers described in Examples 6, 7, and 8, and the thermoplastic polyester carbonate which is sold under the trademark APEC 9350 by Mobay Corporation were cast from methylene chloride into films. The storage modulii were measured using a dynamic mechanical analyzer operating at 1 Hz and a heating rate of 2.5° C./min. The results are shown below. In all cases, the modulii of the block copolymers were higher than either constituent homopolymer.

| Wt Fraction PEK | GPa |
| --- | --- |
| 1.0 | 2.0 |
| 0.8 | 2.1 |
| 0.5 | 2.1 |
| 0.2 | 2.4 |
| 0.0 | 1.8 |

Example 15

Physical Properties of Injection Molded Poly(etherketone)/Polycarbonate Block Copolymer The procedure described in Example 6 was scaled up to produce enough material to injection mold test bars. The molded bars were tested using various ASTM techniques. The results are summarized below.

| | |
| --- | --- |
| Melt flow @ 360° C. | 46.5 g/10 min |
| Heat Distortion Temperature (264 psi) | 145.5° C. |
| ⅛" Notched Impact | 59.8 J/M |
| Unnotched Impact | no break |
| Tensile Yield | 70.21 MPa |
| Tensile Failure | 54.26 MPa |
| % Yield | 43.5 |
| Flex Modulus | 2.82 GPa |
| Flex Strength | 104 MPa |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a block copolymer represented by the formula

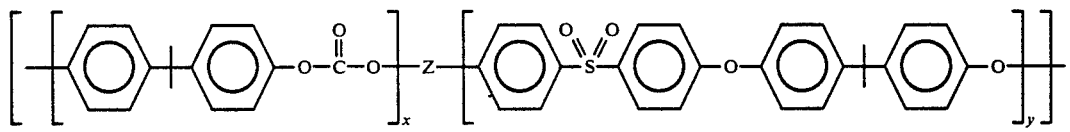

in which
  B represents the residuum of a dihydric phenol,
  Z represents the group

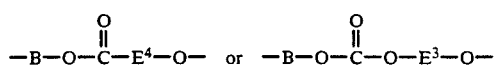

in which
    $E^3$ and $E^4$ each represents one of the two possible groups derived from the residuum $E^5$,
    $E^5$ represents the residuum of an ester group containing bisphenol,
    $E^1$ represents the residuum of a benzenoid compound having an electron withdrawing group in at least one of the positions ortho and para to the valence bonds having a sigma value sufficient to activate a halogen enough to promote reaction of the halogen with an alkali metal phenolate,
    $E^2$ represents the residuum of a dihydric phenol which does not contain ester groups,
    x represents the average number of repeated aryl carbonate units in the block copolymer,
    y represents the average number of repeated aryl ester units in the block copolymer,
  and
    n represents the degree of polymerization
  in which an ester containing poly(aryl ether) composed of recurring units represented by the formula $$-[-E^1-O-E^2-O-]_i-[-E^1-O-E^5-O-]_{ii}$$

in which
    i and ii each represents an integer such that the sum of i plus ii totals 100, provided that ii is greater than 0
  is contacted with a poly(aryl carbonate) having recurring units represented by the formula

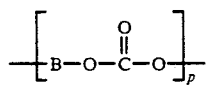

in which
    B represents a nonactivated aromatic radical characterized by the absence of an electron withdrawing group located in a position ortho or para to its carbonate valence bond and
    p represents the number of repeated aryl carbonate units under conditions such that ester/carbonate interchange reactions may occur to form the desired copolymer.

2. The process of claim 1 in which the poly(aryl ether) and poly(aryl carbonate) are contacted in the presence of a transesterification catalyst.

3. The process of claim 1 in which the poly(aryl ether) and poly(aryl carbonate) are contacted at a temperature of from about 150° to about 400° C.

4. The process of claim 1 in which the poly(aryl ether) and poly(aryl carbonate) are contacted in the presence of a solvent having a boiling point below about 400° C.

5. A block copolymer represented by the general formula:

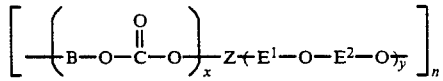

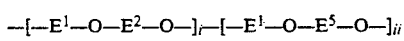

in which in which Z represents:

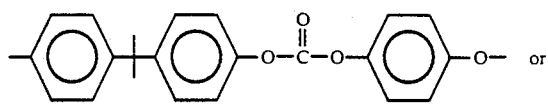 or

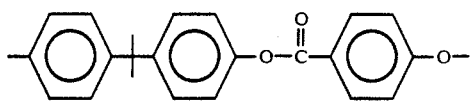

in which x represents the average number of repeated aryl carbonate units;
in which y represents the average number of repeated aryl ether units; and
n represents the degree of polymerization.

6. A block copolymer represented by the general formula:

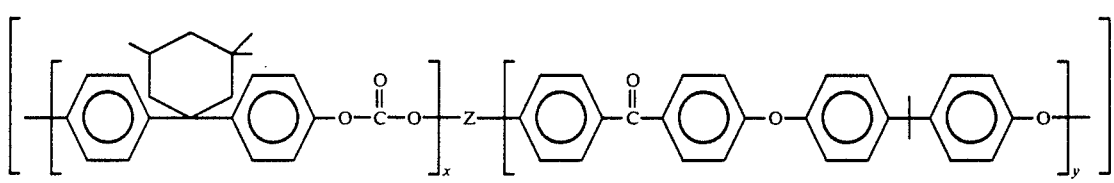

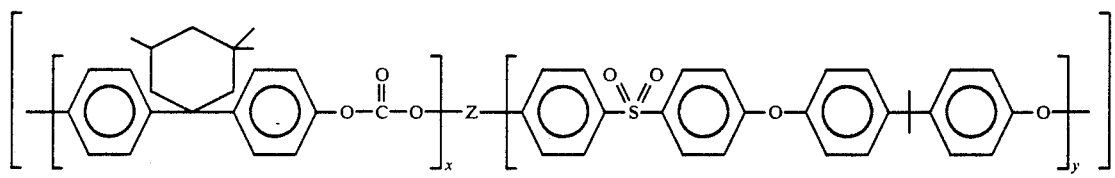

in which Z represents:

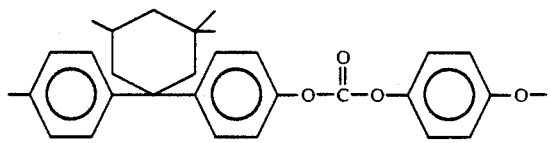

or

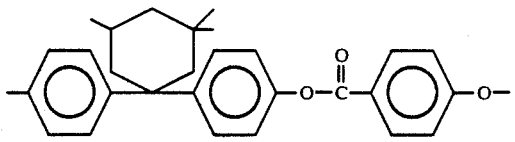

in which x represents the average number of repeated aryl carbonate units;
y represents the average number of repeated aryl ether units; and
n represents the degree of polymerization.

7. A block copolymer represented by the formula:

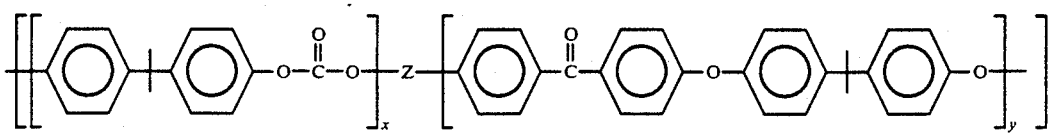

in which Z represents the possible linking groups:

in which x represents the average number of repeated aryl carbonate units;
y represents the average number of repeated aryl ether units; and
n represents the degree of polymerization.

8. A block copolymer represented by the general formula:

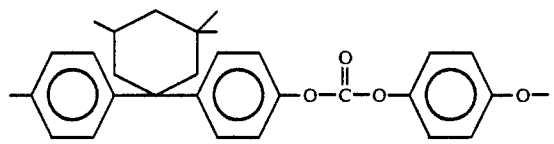

or

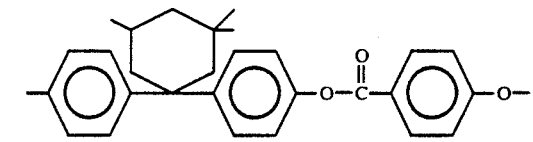

in which x represents the average number of repeated aryl carbonate units;
y represents the average number of repeated aryl ether units; and
n represents the degree of polymerization.

9. A block copolymer represented by the general formula

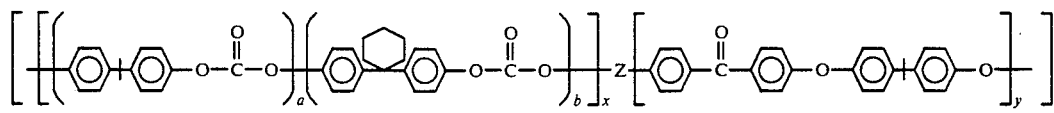

in which
- a and b each represent a mole percent such that a plus b totals 100 mole percent;
- x represents the average number or repeated aryl carbonate units in the block copolymer;
- y represents the average number of repeated aryl either units;
- n represents the degree of polymerization; and
- Z represents the possible linking group:

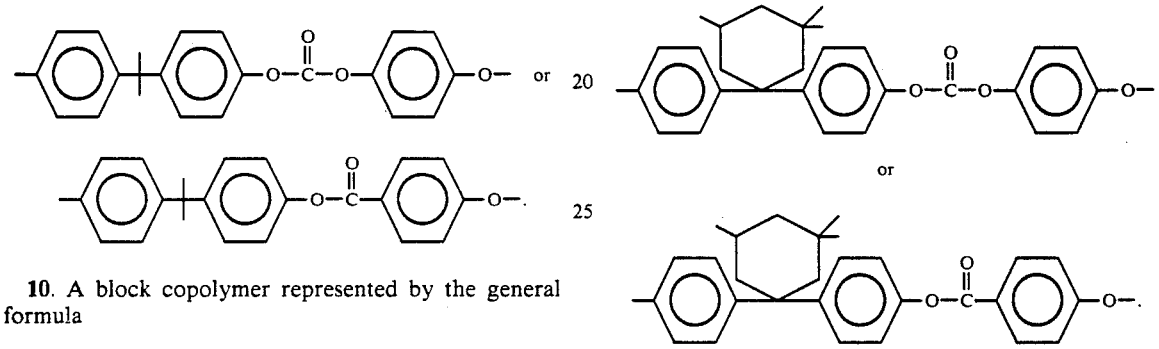

10. A block copolymer represented by the general formula

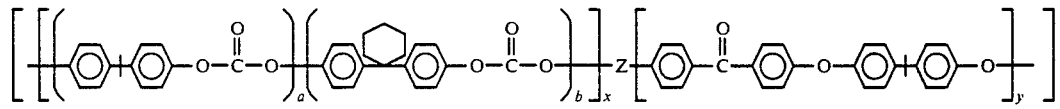

in which a and b each represent a mole percent such that a plus b totals 100 mole percent;
x represents the average member of repeated aryl carbonate units in the block copolymer;
y represents the average number of repeated aryl ether units;
n represents the degree of polymerization; and
Z represents the possible linking group:

* * * * *